(12) United States Patent
Pathangay et al.

(10) Patent No.: US 8,462,110 B2
(45) Date of Patent: Jun. 11, 2013

(54) USER INPUT BY POINTING

(75) Inventors: Vinod Pathangay, Karnataka (IN); Anbumani Subramanian, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 663 days.

(21) Appl. No.: 12/652,049

(22) Filed: Jan. 5, 2010

(65) Prior Publication Data

US 2011/0102318 A1 May 5, 2011

(30) Foreign Application Priority Data

Nov. 3, 2009 (IN) .......................... 2673/CHE/2009

(51) Int. Cl.
*G06F 3/033* (2006.01)
*G09G 5/08* (2006.01)

(52) U.S. Cl.
USPC ......... 345/158; 345/156; 345/173; 178/18.01

(58) Field of Classification Search
USPC ..... 345/156–158, 173–179; 178/18.01–18.04
See application file for complete search history.

(56) References Cited

U.S. PATENT DOCUMENTS

| 7,176,881 | B2 * | 2/2007 | Nishimura et al. | 345/156 |
|---|---|---|---|---|
| 7,802,202 | B2 * | 9/2010 | Fox et al. | 715/831 |
| 2009/0213070 | A1 * | 8/2009 | Kalaldeh et al. | 345/157 |
| 2011/0141009 | A1 * | 6/2011 | Izumi | 345/156 |

OTHER PUBLICATIONS

Case Study: Gestural Entertainment Center for Canesta; Kicker Studio, Canesta, Inc. Mar. 2009 http://www.kickerstudio.com/blog/2009/03/case-study-gestural-entertainment-center-for-canesta/.
Chris Stauffer and W.E.L Grimson "Adaptive Background Mixture Models for Real-time Tracking", Computer Vision and Pattern Recognition, 1999. IEEE Computer Society.
Hrvoje Benko, Andrew Wilson, "DepthTouch: Using Depth-Sensing Camera to Enable Freehand Interactions on and Above the Interactive Surface", Microsoft Research, Microsoft Corporation, Mar. 4, 2009, Technical Report, MSR-TR-2009-23, http://research.microsoft.com/apps/pubs/default.aspx?id=79848.
Kai Nickel and Rainer Stiefelhagen, "Real-time Person Tracking and Pointing Gesture Recognition for Human-Robot Interaction", N. Sebe et al. (Eds.): HCI/ECCV 2004.
Patty Smith and Pranav Mistry, Unveiling the "Sixth Sense," game-changing wearable tech [Online]. Mar. 2009 http://www.ted.com/index.php/talks/pattie_maes_demos_the_sixth_sense.html.
Ryan Block, "Toshiba Qosmio G55 features SpursEngine, visual gesture controls", Jun. 14, 2008 http://www.engadget.com/2008/06/14/toshiba-qosmio-g55-features-spursengine-visual-gesture-controls/.
Y. Wang, T. Yu, L. Shi, and Z. Li, Using human body gestures as inputs for gaming via depth analysis, IEEE Int. Conf. in Multimedia and Expo, Hannover, Jun./Apr. 2008, pp. 993.

* cited by examiner

*Primary Examiner* — Kimnhung Nguyen

(57) ABSTRACT

Presented is apparatus for capturing user input by pointing at a surface using pointing means. The apparatus comprises: a range camera for producing a depth-image of the pointing means; and a processor. The processor is adapted to determine from the depth-image the position and orientation of a pointing axis of the pointing means; extrapolate from the position and orientation the point of intersection of the axis with the surface; and control an operation based on the location of the point of intersection.

20 Claims, 3 Drawing Sheets

USER INPUT BY POINTING

RELATED APPLICATIONS

Benefit is claimed under 35 U.S.C. 119(a)-(d) to Foreign application Serial No. 2673/CHE/2009 entitled "USER INPUT BY POINTING" by Hewlett-Packard Development Company, L.P., filed on Nov. 3, 2009, which is herein incorporated in its entirety by reference for all purposes.

BACKGROUND

In the context of Human-Computer Interaction (HCI), touch-based interaction is perceived as natural, intuitive and less daunting for the user than many other forms of input. Touch-sensitive display technology is available which allows such touch-based interaction. However, interactive display hardware of this kind is typically expensive and complex, compared with conventional displays.

BRIEF DESCRIPTION OF THE DRAWINGS

For a better understanding of the invention, embodiments will now be described, purely by way of example, with reference to the accompanying drawings, in which.

DETAILED DESCRIPTION OF THE INVENTION

Figure 1:
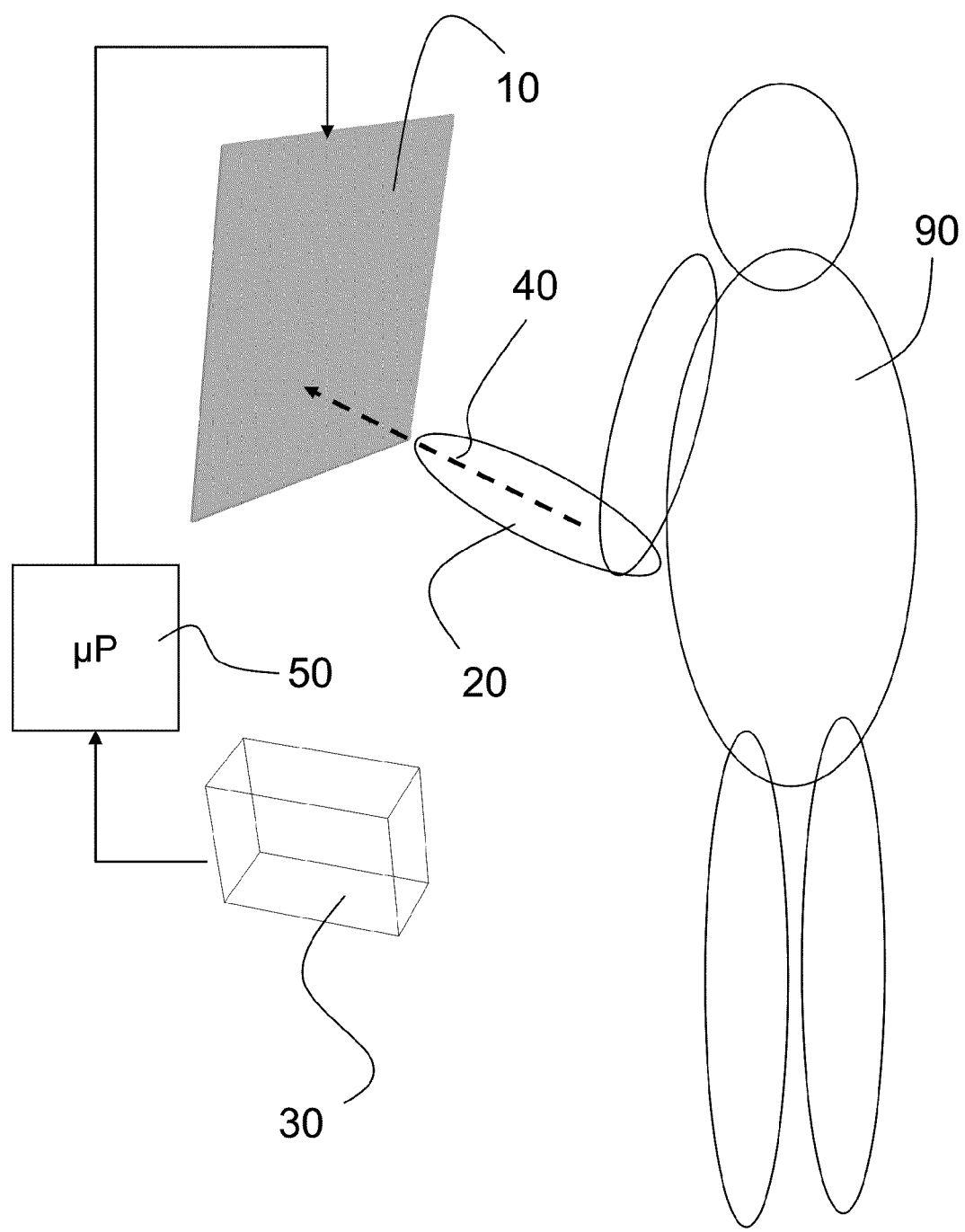
FIG. 1 is a schematic diagram of the arrangement of apparatus according to an embodiment.

An embodiment, pictured in FIG. 1, provides apparatus for capturing user input by pointing. The apparatus comprises a surface 10; pointing means 20 for pointing at the surface; a range camera 30 for producing a depth-image; and a processor 50. The field of view of the camera 30 includes the pointing means 20. The processor 50 is adapted to determine, from the depth-image, the position and orientation of a pointing axis 40 of the pointing means 20. It is also adapted to extrapolate, from the position and orientation of this axis, the point of intersection of the axis 40 with the surface 10. The processor then uses the location of the point of intersection to control an operation.

In the embodiment of FIG. 1, the pointing means 20 comprise part of the body of a user 90. In particular, they comprise the user's forearm.

The surface 10 shown is planar, although this is not essential. In this embodiment, the surface 10 is a display screen. Such a display may be of any type, including a cathode ray tube (CRT) monitor, liquid crystal display (LCD), plasma screen, or a surface on which an image is projected by a projector. The display can be a television screen or computer display.

The range camera 30 is sometimes also known as a depth camera. This is an imaging system which provides a two-dimensional array of depth values—that is, a depth image. Optionally it may also produce a normal (grayscale or color) image in addition to the depth image. In the present example, the range camera is based on the time-of-flight principle: pulses of infra-red light are emitted to all objects in the field of view and the time of arrival of the reflected pulses is measured, to determine the distance from the sensor. Image sensing technology of this kind is available from 3DV Systems, of Yokneam, Israel.

Note that range cameras of other types may also be used. The skilled person will be familiar with a variety of other potentially suitable range-sensing technologies. These include stereo imaging, or stereo triangulation, in which two (or more) image sensors are used to determine a depth image by making disparity measurements. Another possibility is to illuminate a scene with so-called "structured light", where a geometric pattern such as a checkerboard is projected, and depth information is determined from the distortions observed when this known pattern falls on the objects in the scene.

In the arrangement of FIG. 1, the depth camera 30 is positioned to observe the display surface 10, from a relatively short distance of about 0.5 m to 1 m. The camera 30 is spatially positioned such that the display surface 10 is visible in the field-of-view of the camera. The camera is thus in front of the display surface. An interaction volume is defined as the region in front of the display where the user's hand is visible in the field of view during interaction.

A geometric approach is used to estimate the pointing direction of the forearm 20 with respect to the display 10. The line of the pointing direction specifies the region on the screen with which the user intends to interact.

The plane equation of the display surface is $Ax+By+Cz=1$. A pointing axis 40 is defined along the length of the forearm. This is parameterized by a pointing direction, dependent on the orientation of the forearm; and the position of the forearm in three-dimensions. The pointing direction is denoted by $l_x$, $l_y$, $l_z$. The position of the tip of the forearm is given by $x_0$, $y_0$, $z_0$.

A simple, one-time calibration procedure can be used to locate the four corners of the display surface. This may be either manual, whereby the user indicates the positions of the vertices, or could be automatic, by analysis of the image of the scene. To help with automatic or semi-automatic detection of the surface, its boundaries may be identified with markers of distinctive color or brightness. If calibration is manual, then the camera should be manually recalibrated if it is disturbed.

Calibration helps in: (i) estimating the display plane equation in camera image coordinates; and (ii) estimating the homography between the camera image coordinates and the real-world display screen coordinates in 2D. In the current example, all calculations can be performed in camera image coordinates (x, y, z), where z is depth, distance from the camera. This overcomes the need to reconstruct points in a world coordinate system. Systems based on stereo-reconstruction methods may need to perform this reconstruction.

To identify the forearm, it is assumed that in a pointing gesture the forearm is the only moving object observable by the camera in the interaction volume. A foreground-background segmentation method is used. In the present embodiment, the foreground and background are modeled using a Gaussian mixture model. The features modeled are the red, green and blue, (RGB) values of the pixels. The mixture of Gaussians algorithm will be well known to those skilled in the art. The background component can be initialized from a separate calibration image, when no forearm is present. To initialize the foreground part of the mixture model, the moving forearm is treated as the foreground and the remainder of the image is treated as the background.

Blob analysis on the segmented foreground mask is used to remove blobs that are smaller than an empirical threshold. This controls the effects of noise, by eliminating small misclassified regions. The result of this "cleaning" gives the forearm blob. Once the forearm is localized in an image frame, the foreground pixel locations and their depth values are used to estimate the pointing axis. For each column x in the forearm blob, the mean of vertical locations and depth values ($\bar{y}$ and $\bar{z}$ respectively) is calculated. These points (x, $\bar{y}_x$, $\bar{z}_x$) are then used to fit a line using the least-squares method. Thus the line parameters ($l_z$, $l_y$, $l_z$) and the forearm tip ($x_0$, $y_0$, $z_0$) are obtained. In this example, the forearm tip is taken to be the extremity of the blob that is nearest to the display surface.

The range camera observes only one side of the forearm; so the depth measurements of the side visible to the camera are inevitably biased slightly compared with the true central axis of the forearm. However, this slight bias can either be ignored or easily compensated for.

Given the forearm tip and pointing axis direction, the point of intersection of the pointing axis with the display plane can be found by analytical solution. This gives the image pointing location on the display surface in the image as seen by the camera. The homography estimated during the calibration procedure can be used to map the pointing location from the depth image coordinates to the screen coordinates of the display surface.

The distance from the forearm tip to the display surface plane can also be computed analytically to obtain an interaction distance. Thus the pointing or touch location and distance from the display surface is estimated. The distance from the user's hand to the display can be used as a measure to provide hover interaction. By determining a distance from the pointing means to the surface; the processor can control the operation differently according to this distance.

Figure 2:
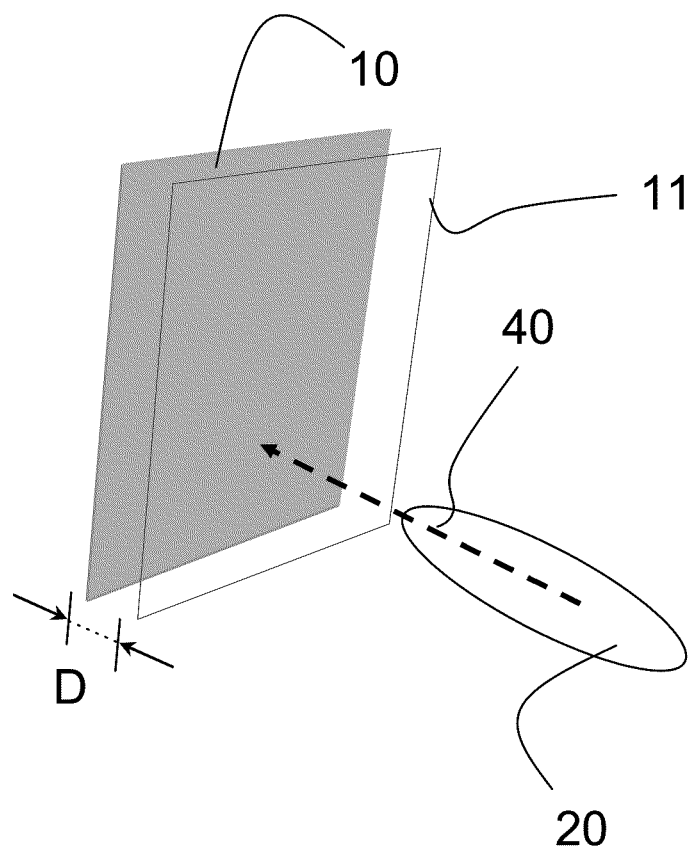
FIG. 2 shows detail of FIG. 1.

An example of this is illustrated in FIG. 2. If the distance from the display is less than a small threshold distance, D, a touch-like interaction happens. If the distance is greater than this threshold, a hover-like interaction occurs. A hover interaction may involve, for example, moving a pointer (similar to moving a conventional mouse). A touch interaction might involve, for example, a selection (like clicking a mouse button). One of the effects of this is to provide any display surface with the qualities of a touch-sensitive screen. That is, a surface that is not touch sensitive can be made to emulate a touch-sensitive surface. In the example of FIG. 2, the distance is measured perpendicular to the planar display surface. However, in other applications, it could be measured along the pointing axis (which may have a different orientation).

The processor 50 can comprise hardware of various types. In this example, the processor is a central processing unit (CPU) of a desktop personal computer (PC). Accordingly, the surface 10 is the display of the PC, which is under the control of the CPU 50. The apparatus allows the user 90 to provide input to the PC by pointing. The processor 50 acts on this user input by controlling an operation depending on the location pointed to by the user—that is, the location of the intersection of the pointing axis 40 and the surface 10. The operation could be of almost any type: for example, the activation of a software application or the pressing of a button or selection of a menu item within an application. Of course, as will be readily apparent to those skilled in the art, the processor may be comprised in another hardware device, such as a set-top box (STB). The range of suitable operations which may be controlled will vary accordingly. With a STB, for example, the operation controlled may involve changing channels or browsing an electronic program guide (EPG).

Figure 3:
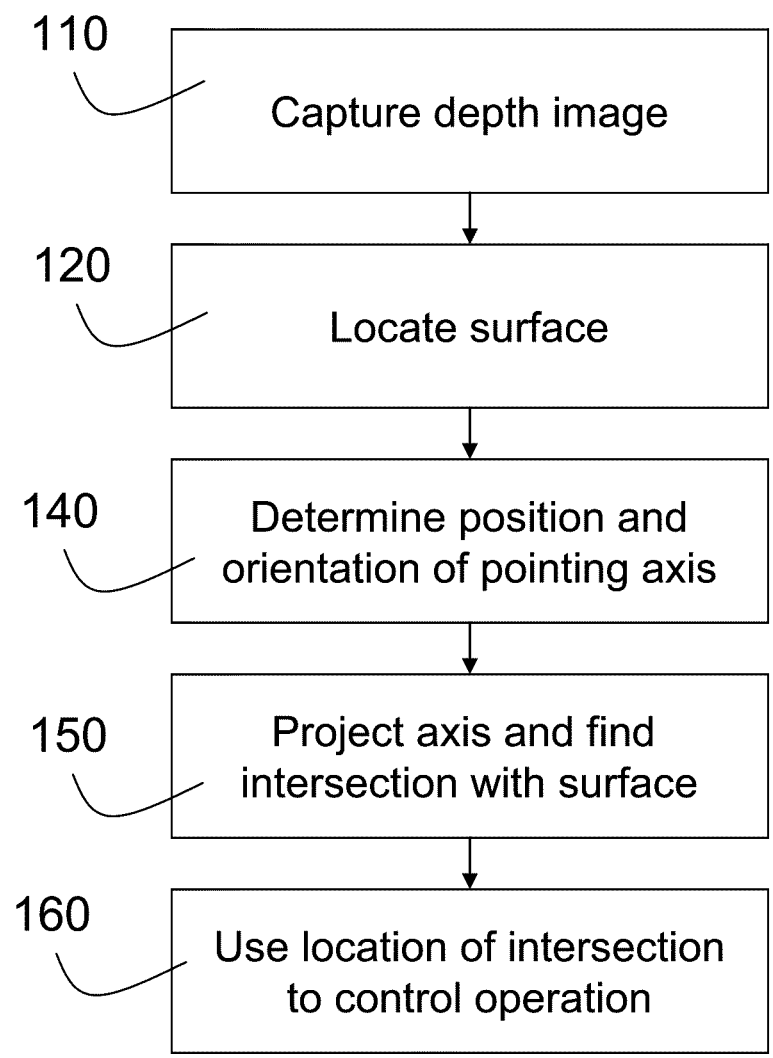
FIG. 3 is a flowchart of a method according to an embodiment.

In embodiments, the processor executes a method of capturing user input by pointing at a surface using pointing means, as illustrated in FIG. 3. The method comprises: capturing 110 a depth-image of the pointing means 20; determining 140, from the depth-image, the position and orientation of a pointing axis 40 of the pointing means 20; extrapolating 150, from the position and orientation, the point of intersection of the axis 40 with the surface 10; and controlling 160 an operation based on the location of the point of intersection.

The method can also comprise, before the step 150 of extrapolating the point of intersection: capturing a depth-image of the surface; and determining 120, from the depth-image, the location of the surface. In some embodiments, the depth image of the surface and the depth image of the pointing means will be the same image. In this case, the calibration or registration step of locating the surface can be done for each captured image frame (assuming it is automatic). For a sequence of frames, such calibration and recalibration can include or be replaced by tracking of the position of the surface in the depth image. In other embodiments, the calibration step is carried out in advance, using a separate depth image from which the pointing means are absent.

The user's forearm is one simple and intuitive example of the pointing means. However, other pointing means may also be used. For example, the user may hold a wand or other pointer in his/her hand. This could be colored distinctively or exhibit characteristic markers, to aid detection in the image. Equally, another body part could be used, such as the hand, an extended finger or the head. In each case, the position and orientation of the pointing means can be calculated from a depth image, to define the pointing axis.

The examples above have discussed the control of an operation based on the location pointed to on a surface—that is, the point of intersection of the pointing axis and the surface. It is also possible to use information relating to the direction of the pointing axis at the intersection. This can be used to add another equally intuitive dimension to the user interaction. For example, if the user is pointing at an object on a display surface, the orientation of the pointing axis could be used to define a direction of motion in which the user wishes to move the object. Thus, by pointing at an object from one side, the user can cause it to move in one direction, and by pointing at it from the other side, the user can cause it to move in the reverse direction. This mode of interaction may also be beneficial when three-dimensional virtual scenes are portrayed on the display. In this case, the vector of the pointing axis can be mapped to the coordinates of the virtual three-dimensional space. The intersection of the pointing ray with a virtual surface in this space can then be used to control operations. This can enable, for example, parallax effects, where a user is able to point to displayed objects at different (virtual) depths by pointing "around" nearer virtual objects. This may provide a richer interactive experience.

In the example described above and shown in FIG. 1, the surface being pointed at is visible in the field-of-view of the range camera. However, this is not essential in all embodiments, provided the apparatus can be calibrated so that the relative disposition of the pointing means and the surface is known. If the surface is not in the field of view, the homography can be calculated by other methods. For example, the camera could be rigidly fixed to the surface—in this case, the location of the surface relative to the camera coordinates will be fixed and known, so there is no need for the surface to appear in the scene of the depth image. The homography can be calculated in advance, based on the rigid relationship. The same applies if the relative arrangement of the surface can be determined automatically by other means, when the apparatus is in use. For example, the camera might be adjustably mounted to the display by an articulated connection or joint, whereby sensors provide measurements of the geometry of the adjustments. The homography can then be calculated from these sensor measurements.

The techniques presently described may be particularly useful when the surface being pointed at is a display surface.

In other embodiments, the surface could be of any other kind. If the surface is not a display surface, it may still be used in combination with a display. Preferably, the display provides feedback to the user who is providing input by pointing at the surface. For example, the surface pointed at may be an ordinary planar surface, such as part of a desk or wall. The user points at this passive surface to control operations that are then represented on a display. That is, the surface pointed at is assigned a one-to-one correspondence with, or a unique mapping to, a display. This can allow control of a kind similar to a conventional mouse or a touch-sensitive tablet—but without the need for a mouse or touch-sensitive hardware, respectively.

In other related examples, the pointing means may be a pen, pencil, or an artist's paintbrush. The surface pointed at may be a book, a sheet of paper, or a canvas on an easel.

Embodiments can emulate touch control of a display surface (or any other surface) without the need for conventional touch-sensitive technology. They can also create a richer interaction experience than conventional touch-screens, because both touch and hover interactions become possible.

By defining a pointing axis of the pointing means, more precise and intuitive user input can be enabled. The pointing axis enables truly three-dimensional input. This contrasts with other kinds of gesture-based control, where the position or type of gesture are determined in only in a two-dimensional plane parallel to the display screen.

Meanwhile, the use of a range camera eliminates the need for the user to wear, carry or hold active pointing means, with inbuilt sensor or transmitter technology. Instead, the user's own hand, finger or forearm can be used as the pointing means. This can make the control of operations more intuitive and accessible.

With embodiments using infra-red time-of-flight technology, it has been found that sometimes, due to the material properties of LCD screens, the infra-red illumination falling on the screen itself is not diffusely reflected, leading to depth values which are inaccurate. However, in this case, the border or frame of the screen can be used for calibration. The depth data can be interpolated from the four corners of the display screen localized during calibration.

Further refinements may be useful when the display is fast changing, such as in videos. Here, the motion-based foreground segmentation algorithm may segment the screen as foreground, along with the moving forearm. This effect can be mitigated either by incorporating knowledge of the displayed images into the segmentation algorithm, or by including depth measurements in the segmentation process.

It may be desirable to remove jitter in the pointing location by using temporal smoothing of the pointing location coordinates on the surface, or a tracking algorithm which incorporates a smooth motion model, such as a Kalman filter.

The approach described above can be extended for larger display surfaces such as projector screens. Here the distance from the screen and the corresponding interaction volume will be larger.

The calibration step 120 can be automated by displaying a known, regular pattern, such as a checkerboard, and localizing corner points of the pattern automatically. This will automatically estimate the homography and find the display surface plane equation in the camera coordinates. Such auto-calibration can be useful in scenarios where a wearable camera is used. Recalibration can be performed when sufficient motion is detected.

While specific embodiments have been described herein for purposes of illustration, various other modifications will be apparent to a person skilled in the art and may be made without departing from the scope of the invention.

The invention claimed is:

1. Apparatus for capturing user input by pointing at a surface using pointing means, the apparatus comprising:
    a range camera for producing a depth-image of the pointing means; and
    a processor, adapted to
        determine from the depth-image the position and orientation of a pointing axis of the pointing means;
        extrapolate from the position and orientation the point of intersection of the axis with the surface; and
        control an operation based on the location of the point of intersection.

2. The apparatus of claim 1, wherein the pointing means comprise part of the user's body.

3. The apparatus of claim 1, wherein the processor is adapted to:
    determine a distance from the pointing means to the surface; and
    control the operation differently according to the distance.

4. The apparatus of claim 3, wherein said surface comprises a display device.

5. The apparatus of claim 4, wherein, if the distance from the pointing means to the surface of the display device exceeds a threshold, a hover action is performed on said display device such that movement of the pointing means causes movement of an object displayed on the display device.

6. The apparatus of claim 5, wherein, with said pointing means pointing at said object from one side, said object moves in a first direction and moves in an opposite direction if said point means is moved to point at said object from an opposite side of said object.

7. The apparatus of claim 4, wherein, if the distance from the pointing means to the surface of the display device is less than a threshold, a selection action is performed on said display device such an object displayed on the display device along the pointing axis of the pointing means is selected.

8. The apparatus of claim 4, wherein said apparatus comprises a set-top box and said display device displays an electronic program guide under the control of said set-top box.

9. The apparatus of claim 1, wherein the processor is adapted to control the operation based on the orientation of the pointing axis.

10. The apparatus of claim 1, wherein the field of view of the camera includes the surface.

11. The apparatus of claim 1, wherein the camera is positioned at the same side of the surface as the pointing means.

12. The apparatus of claim 1, wherein the surface comprises a display or a one-to-one correspondence is assigned between the surface and a display.

13. The apparatus of claim 1, wherein said range camera emits pulses of infra-red light and a distance from the camera to different portions of the pointing means is determined by a time of arrival of pulses reflected back to the camera by the pointing means, said distances being used to form said depth-image.

14. The apparatus of claim 1, wherein said processor is further configured to extrapolate said position and orientation of said pointing means by foreground-background segmentation in which said pointing means is considered as a foreground of said depth image and said background is determined using a depth image from said range camera taken when said pointing means is absent.

15. A method of capturing user input by pointing at a surface using pointing means, the method comprising:

capturing a depth-image of the pointing means;
determining from the depth-image the position and orientation of a pointing axis of the pointing means;
extrapolating from the position and orientation the point of intersection of the axis with the surface; and
controlling an operation based on the location of the point of intersection.

16. The method of claim 15, further comprising, before the step of extrapolating the point of intersection:
capturing a depth-image of the surface; and
determining from the depth-image the location of the surface.

17. The method of claim 15, further comprising:
determining a distance from the pointing means to the surface; and
controlling the operation differently according to the distance.

18. The method of claim 17, comprising controlling the operation according to the distance so as to emulate touch-sensitivity of the surface.

19. A computer program embodied on a non-transitory computer readable medium, said computer program comprising computer program code means adapted, if said program is run on a computer, to control the computer to capture user input, the user input comprising pointing at a surface using pointing means, the capture of said user input comprising:
receiving, from a range camera, a depth-image of the pointing means;
determining from the depth-image, using a physical computing device, the position and orientation of a pointing axis of the pointing means;
extrapolating from the position and orientation, using a physical computing device, the point of intersection of the axis with the surface; and
controlling an operation of a physical computing device, based on the location of the point of intersection.

20. A computer program as claimed in claim 19 embodied on a computer-readable medium.

* * * * *